(12) United States Patent
Koch et al.

(10) Patent No.: US 6,598,634 B1
(45) Date of Patent: Jul. 29, 2003

(54) CURED TIRE INCLUDING ENCAPSULATED HIGH MODULUS COMPOSITE

(75) Inventors: Russell W. Koch, Hartville, OH (US); Charles D. Spragg, Hudson, OH (US); Edward G. Markow, Oakdale, NY (US); James M. Kirby, Akron, OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/433,435

(22) Filed: Nov. 4, 1999

Related U.S. Application Data (63) Continuation-in-part of application No. 09/057,106, filed on Apr. 8, 1998, now Pat. No. 6,012,498, and a continuation-in-part of application No. 09/067,062, filed on Apr. 27, 1998, now Pat. No. 6,117,258.

(51) Int. Cl.⁷ .............................. B60C 9/00; B60C 9/18; B60C 17/00; B60C 1/00; B60C 19/12; B29D 30/06

(52) U.S. Cl. ..................... 152/197; 152/516; 152/526; 152/527; 152/537; 152/565; 156/123; 156/130; 156/315

(58) Field of Search ................. 152/526, 516, 152/197, 537, 565, 527; 156/315, 331.4, 331.5, 331.7, 123, 130

(56) References Cited

U.S. PATENT DOCUMENTS

| | | |
|---|---|---|
| 3,911,987 A | 10/1975 | Takusagawa et al. |
| 3,949,798 A | 4/1976 | Gardner et al. |
| 3,954,131 A | 5/1976 | Hoshino et al. |
| 4,067,372 A | 1/1978 | Masson |
| 4,111,249 A | 9/1978 | Markow |
| 4,202,393 A | 5/1980 | Ikeda et al. |
| 4,203,481 A | 5/1980 | Ranik, Jr. |
| 4,261,405 A | 4/1981 | Yamauchi et al. |
| 4,265,288 A | 5/1981 | Kaneko et al. |
| 4,287,924 A | 9/1981 | Deck et al. |
| 4,318,434 A | 3/1982 | Markow |
| 4,365,659 A | 12/1982 | Yoshida et al. |
| 4,428,411 A | 1/1984 | Markow et al. |
| 4,456,048 A | 6/1984 | Markow et al. |
| 4,459,167 A | 7/1984 | Markow et al. |
| 4,673,014 A | 6/1987 | Markow |
| 4,708,186 A | 11/1987 | Kopsco et al. |
| 4,711,286 A | 12/1987 | Kabe et al. |
| 4,734,144 A | 3/1988 | Markow |
| 4,754,794 A | * 7/1988 | Bocquet et al. .............. 152/527 |
| 4,794,966 A | 1/1989 | Markow |
| 4,800,120 A | 1/1989 | Jadamus et al. |
| 4,917,164 A | 4/1990 | Ushikubo et al. |
| 4,929,684 A | 5/1990 | Roland et al. |
| 5,082,713 A | 1/1992 | Gifford |
| 5,201,971 A | 4/1993 | Gifford |
| 5,291,930 A | 3/1994 | Kikuchi et al. |
| 5,323,829 A | 6/1994 | Hubbell et al. |
| 5,413,160 A | 5/1995 | Giuliano |
| 5,513,683 A | 5/1996 | Causa et al. |
| 5,558,144 A | 9/1996 | Nakayasu et al. |
| 5,576,104 A | 11/1996 | Causa et al. |
| 5,879,484 A | 3/1999 | Spragg et al. |

FOREIGN PATENT DOCUMENTS

| | | |
|---|---|---|
| EP | 0 200 055 A2 | 11/1986 |
| EP | 0 333 434 A2 | 9/1989 |

OTHER PUBLICATIONS

Patent Abstracts of Japan, abstract of JP 10–157017 published Jun. 16, 1998, inventor Iwasick: Susumau

* cited by examiner

*Primary Examiner*—Adrienne C. Johnstone
(74) *Attorney, Agent, or Firm*—Meredith E. Palmer; Daniel J. Hudak; Arthur M. Reginelli (57) ABSTRACT

A laminate contains a composite, comprising a high melting point thermoplastic such as polyphenylene or epoxy and high modulus fibers such as carbon or graphite, which is encapsulated with a resin. A primer adheres the encapsulated composite to a rubber material such as a tire tread. Alternatively, an undertread layer adheres the tire tread to the primed encapsulated composite. The laminate can be used as a run flat belt in a tire.

18 Claims, 6 Drawing Sheets

CURED TIRE INCLUDING ENCAPSULATED HIGH MODULUS COMPOSITE

CROSS REFERENCE

This application is a Continuation-In-Part of U.S. Ser. No. 09/057,106, filed Apr. 8, 1998, now U.S. Pat. No. 6,012,498 for Tires Having Belts of High Modulus Composites.

This application is also a Continuation-In-Part application of U.S. Ser. No. 09/067,062, filed Apr. 27, 1998, now U.S. Pat. No. 6,117,258 for Band Element and Method for Building Same for A Run Flat Banded Tire.

FIELD OF THE INVENTION

The present invention relates to a laminate which can be used as a run flat belt in a vehicle tire. More specifically, the present invention relates to an encapsulated composite having a very high modulus of elasticity which can be bonded to a rubber layer such as a tire tread through a primer layer, or alternatively through a primed undertread layer.

BACKGROUND OF THE INVENTION

Heretofore, polyphenylene sulfide-high modulus fiber composites were generally not bonded to rubber. In the field of tires, various types of tire cords such as polyaramide, polyester, nylon, and the like were adhered to rubber utilizing various adhesives, see U.S. Pat. Nos. 4,711,286; 5,082,713; 5,201,971; 5,291,930; 5,323,829; 5,413,160; 5,513,683; 5,558,144; and 5,576,104.

SUMMARY OF THE INVENTION

High modulus composites having a high modulus of elasticity (i.e. Young's modulus) contain high strength fibers such as carbon, graphite, or boron, which are bonded together by a high temperature binder such as a polyphenylene sulfide, an epoxy, or a polyimide. Alternatively, high melting point polyurethane or polyurea binders can be utilized. The composites, which are encapsulated with various sealing resins, are bonded by a primer or a primed undertread layer to a rubber substrate. The undertread layer is desirably made of natural rubber or contain small amounts of synthetic rubber therein. The above laminate can be used as a run flat belt in a tire and has good adhesion to a tire tread and/or a tire carcass.

DETAILED DESCRIPTION

Figure 13:
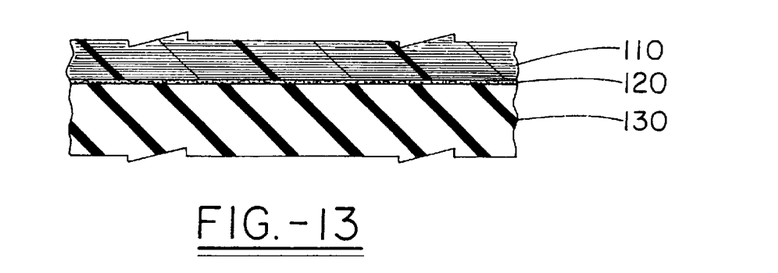
FIG. 13 is a cross sectional view of an article showing the composite adhered to a rubber substrate through the use of a primer.
Figure 14:
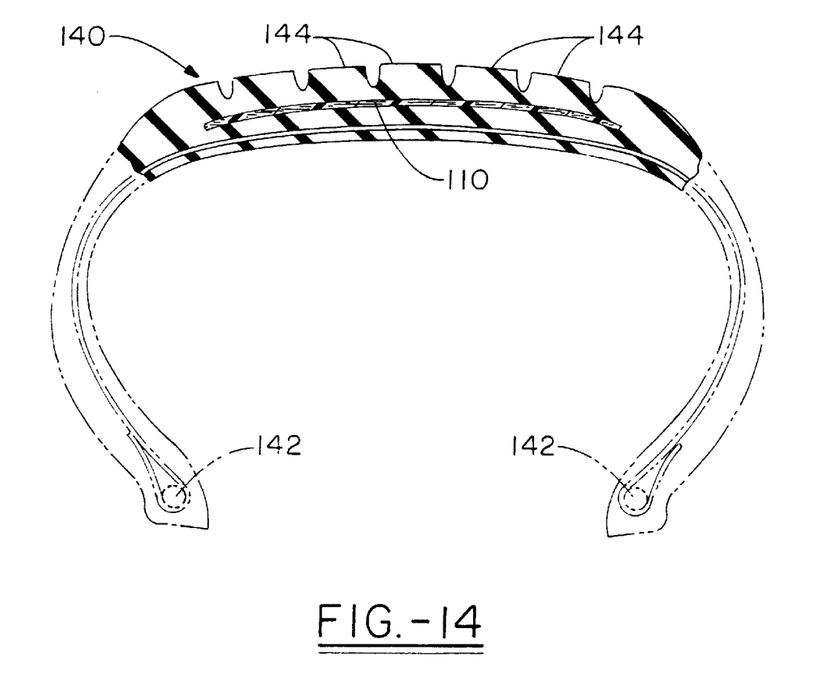
FIG. 14 is a cross sectional view showing the composite utilized as a belt in a tire.
Figure 15:
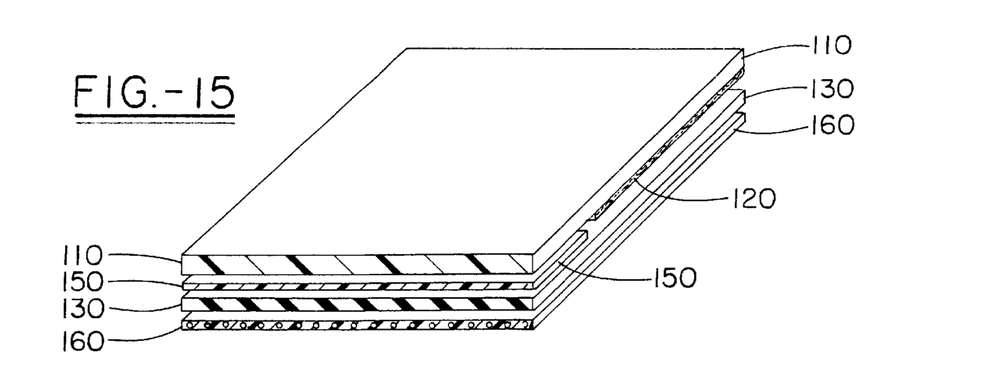
FIG. 15 is perspective view showing the preparation of a sample for peel adhesion testing.

A laminate which contains a high modulus composite has good adhesion to one or more rubber substrates. An embodiment containing the high modulus composite as shown in FIGS. 13–15 will be described, followed by various embodiments as shown in FIGS. 3–12 which contain an elastic rubber coating about the composite. Then, a laminate which contains an encapsulated high modulus composite as shown in FIGS. 16–19, having improved adhesion to rubber substrate(s), will be described.

The binder of the composite is a high melting point thermoplastic polymer such as polyphenylene sulfide or polyimide. Melting points of the polymer are generally at least 225° C. or 250° C., desirably at least 275° C., and preferably at least 300° C., 325° C., or even 350° C. Conventional polyphenylene sulfides can be utilized such as RYTON from Phillips Petroleum, and the like. The polyimides are preferably aromatic and available as Kaptor, Vespel, and Pyralin from DuPont, and Torlon from Amoco.

Alternatively, high melting point polyurethanes and/or polyureas can also be utilized. The polyurethanes are derived from polysiocyanates which generally have the formula $R(NCO)_n$ where n is an integer of 2, 3 or 4 with approximately 2 being preferred. However, it is to be understood that since combinations of various polyisocyanates can be utilized, "n" can vary and often is not an integer. R is an aliphatic having from about 2 to about 20 carbon atoms or preferably an aromatic including an alkyl substituted aromatic having from about 6 to about 20 carbon atoms with from about 6 to about 15 carbon atoms being desired, or combinations thereof. Examples of suitable polyisocyanates include 1,6-diisocyanto hexane, 2,2,4- and/or 2,4,4-trimethylhexamethylene diisocyanate, p- and m-tetramethyl xylene diisocyanate, dicyclohexylmethane-4,4'-diisocyanate (Hydrogenated MDI), 4,4-methylene diphenyl isocyanate (MDI), p- and m-phenylene diisocyanate, 2,4- and/or 2,6-toluene diisocyanate (TDI), durene-1,4-diisocyanate, isophorone diisocyanate and isopropylene bis-(p-phenyl isocyanate). TDI is desirably utilized. The various diphenylmethane diisocyanates (MDI) and mixtures of MDI with polymeric MDI having an average isocyanate functionality of from about 2 to about 3.2 are preferred.

The preparation of the polyurethanes and/or polyureas are well known to the art and to the literature. For example, a short chain oligomer or polymer derived from polyester or polyether polyols generally having a molecular weight of from about 55 to about 1,000 and preferably from about 6 to about 200 are reacted with the above-noted diisocyanates to form a urethane prepolymer. Similarly, a short chain diamine can be utilized and reacted with the above-noted diisocyanates to form a urea prepolymer. The short chain oligomers or polymers are desirably not crosslinked and aromatic diisocyanates are generally utilized to yield high melting point urethane or urea prepolymers which also generally have a high modulus of elasticity. The resulting prepolymer is subsequently reacted with diols, diamines, diacids, or amino alcohols, and the like to cure the same and form a polyurethane or polyurea. Alternatively, the polyurethanes and/or polyureas are formed by reacting an existing prepolymer with the above-noted curing or chain extending agents.

The equivalent ratio of isocyanate groups (NCO) reacted with the hydroxyl groups (OH) or amine groups ($NH_2$) of the short chain compound is generally from about 0.90 to about 1.10, desirably from about 0.95 to about 1.05, and preferably from about 0.98 to about 1.02.

Regardless of whether the binder is polyphenylene sulfide, polyimine, polyurethane, or polyurea, they generally have good resistance to organic solvents. However, polyphenylene sulfide binders are preferred.

A fiber is utilized with the binder so that the resulting composite has high modulus and high strength. Preferred fibers include those having high modulus such as graphite or carbon. To a lesser extent, boron fibers, nylon fibers, polyester fibers, and glass fibers can also be utilized. While fibers of various lengths can be utilized, generally continuous filaments, that is filaments: of very long length such as at least 20, 30, 50, or 100 meters and the like are desired. The amount of the fibers is generally from about 40 to about 90 parts by weight, desirably from about 50 to about 85 parts by weight, and preferably from about 60 to about 80 parts by weight for every 100 parts by weight of the high melting point polymeric binder. The composite can be of any desired shape and form and typically is made by melting the binder onto a continuous wound fiber(s) or by mixing the fibers and the high temperature binder in a molten state, shaping the mixture into a desired form such as a sheet, and cooling. A preferred shape is in the form of a circular band which can be used as a belt to replace the steel cords utilized in a tire. When a continuous circular band is formed, it contains a plurality of layers impregnated with the binder wherein the ends of the various layers or belts are alternated about the circumference of the band to ensure strength. The modulus of elasticity of the composite, i.e., Young's modulus, is desirably at least 750,000 and preferably at least 1,000,000 psi.

When polyurethane or polyurea binders are utilized, the fibers are generally added during the polymerization thereof. Moreover, the polyurethanes or polyurea composites generally have a lower modulus, such as from about 250,000 to about 1,000,000 psi.

So high is the modulus and strength of the composite that it resists punctures from sharp objects such as nails, glass, metal, etc. Thus, essentially a no flat, i.e., a run flat tire can be produced with regard to eliminating penetration by a sharp object through the tread portion thereof.

Rubbers to which the composite can be bound generally include natural rubber, rubbers made from conjugated diene monomers having from 4 to 10 carbon atoms such as butadiene, isoprene, hexadiene, and the like, as well as combinations thereof. Another suitable class of rubbers are various copolymers made from conjugated diene monomers having from 4 to 10 carbon atoms with vinyl substituted aromatic monomers having from 8 to 12 carbon atoms such as styrene, alpha-methyl styrene, and the like, with a preferred copolymer being styrene-butadiene rubber.

The rubbers can be compounded with conventional rubber additives such as fillers, for example, carbon black, magnesium oxide, etc., various antioxidants, various processing aids, stearic acid, zinc oxide, process oils, vulcanization compounds such as sulfur, zinc oxide, various vulcanization accelerators such as thiazoles, thiurams, sulfenamides, guanidines, and the like. Generally, a master batch is first formed and then curing compounds such as sulfur and various accelerators are added thereto, formed into an appropriate end product, and cured.

The composite is bonded to a very dissimilar material, i.e., rubber, through the use of generally specific types of primers so that a good bond is formed. The primer is generally applied to the composite, the rubber, or both, with the composite subsequently being bound to the rubber. Desirably, the rubber is uncured when the composite is bound thereto with the primer, and then subsequently the rubber is cured although less desirably, the rubber can be initially cured.

Surprising, it has been found that a desired class of primers are so-called metal primers which are applied to a metal so that other objects can be adhered thereto. Various metal primers desirably contain dinitroso compounds or derivatives thereof and include various Chemlok compounds manufactured by the Lord Corporation of Erie, Pa., U.S.A. A preferred primer is Chemlok 254 (Lord Corporation) which is a mixture of a polymer, a halogenated paraffin, and a curative, dissolved or dispersed in an organic solvent system such as toluene and xylene. This composition is generally a black liquid, has a viscosity range (Brookfield LVT, Spindle No. 2 at 30 rpm at 77° F. (25° C.)) of 150 to 450 centipoises, contains approximately 25–30 percent by weight of non-volatile contents, has a density of approximately 8.1 to 8.5 lbs./gal., a flash point of 44° F. (7° C.), and a shelf life of generally 6 months at 70–80° F. (21–26° C.) storage temperature. More specifically, Chemlok 254 is believed to be a mixture of chlorosulfonated polyethylene (for example, Hypalon 48) chlorinated paraffin (for example, Chlorowax 40), poly(p-dinitrosobenzene) and carbon black dissolved or dispersed in a mixture of toluene and xylene.) The chlorosulfonated polyethylene is characterized by infrared (IR) spectroscopy as having absorption bands at 1420, 1428, 1362, 1250, 1162, 658, and 604 $cm^{-1}$. The chlorinated polyethylene is characterized by having IR absorption bands at 1458, 1445, 1371, 1258, 907, 789, 732, 651, and 613 $cm^{-1}$. Poly(p-dinitrosobenzene) was identified by IR absorption bands at 3111, 1483, 1458, 1258, 1102, 1008, 857, 776, and 563 $cm^{-1}$. Chemlok 254 also contained a small amount of yellow material which was characterized by IR absorption bands at 3104, 1715, 1602, 1600, 1496, 1371, 1152, 826, and 701 $cm^{-1}$.

Another primer which has been found to be suitable to adhere rubber to the composite is Chemlok 252X, also manufactured by Lord Corporation. This primer is similar to Chemlok 254 except that one of the ingredients which exists in the 254 formulation is formed in situ by oxidizing the same with a lead salt.

An example of another suitable primer is an aqueous metal primer composition containing a polyvinyl alcohol-stabilized aqueous phenolic resin dispersion, a latex of a halogenated polyolefin, and metal oxide. Such a compound is described in U.S. Pat. No. 5,200,455, which is hereby fully incorporated by reference with regard to all aspects thereof, including the making and preferred embodiments of the aqueous metal primer composition.

Referring to the drawings, FIG. 13 is a cross sectional view along the length of the composite fibers showing a high strength, high modulus composite 110 of the present invention adhered to rubber 130 through the use of primer 120. The resulting laminate, as noted above, can be utilized wherever an exceedingly high modulus and strength composite bound to a rubber is desired such as in engine mounts, muffler clamps, and the like. A preferred end-use of the present invention is utilization of the composite 110 as one or more reinforcing belts as in a tire 140 (see FIG. 14) having tire bead 142 and various other components of a tire such as treads 144, an innerliner, carcass plies, sidewalls, and the like, as is well known to the art and the literature. FIG. 14 is a cross sectional view of the tire wherein the composite fibers are transverse to that shown in FIG. 13, i.e., generally extend into and out of the plane of the drawing sheet.

The invention will be better understood by reference to the following examples which serve to illustrate, but not to limit the scope of the present invention.

CONTROL AND EXAMPLE 1

Two pieces, 6×6×0.075 inches, composed of graphite fibers impregnated with a thermoplastic polyphenylene sulfide resin were sandblasted on one surface, washed with acetone on Rymplecloth (a purified cheesecloth) and allowed to dry. A control was coated with a Bandag retread commercial cement, and the other was coated with Chemlok 254 (Lord Chemical Co.). The cement and primer were allowed to thoroughly dry for 15 to 20 minutes.

The rubber to be bonded was prepared by laminating a piece of reinforcing ply material (6×6×0.040 inches) onto the test material. The ply material was a ply skim for a tire composed of natural rubber and other conventional compounding ingredients such as carbon black, zinc oxide, curatives, antioxidants, and the like. The dimensions of the test rubber were 6×6×0.100 inches.

The reinforced rubber was then assembled with the rubber 130 surface to be tested facing the Chemlok 254 primer 120 applied to the graphite fiber/PPS composite 110. This construction is generally shown in FIG. 15.

For purposes of testing, one end of composite 110 was separated from a corresponding end of rubber 130 backed with a reinforcing ply 160 by a nonadherent separator 150. The rubber was cured 30 minutes at 300° F. Separator 150 was then removed. The peel adhesion test was carried out by gripping the free end of the composite and the free end of the rubber containing the reinforcing backing material thereon. Results are set forth in Table I.

TABLE I

| | Peak (Pli) | Avg. (Pli) | Failure | Primer | Condition |
|---|---|---|---|---|---|
| Control | 0.72 | 0.72 | Interfacial | Bandag | Composite was sandblasted |
| Ex. 1 | 265 | 108 | To Backing | Chemlok 254 | Composite was sandblasted |

EXAMPLES 2–4

Three additional samples were tested. The examples were built as described in Examples 1. In Example 2, however, the surface of the composite (i.e., graphite/PPS) was not sandblasted whereas Examples 3 and 4 were sandblasted. Examples 2, 3, and 4 used a different Chemlok primer, 252X (Lord Chemical Co.). It was found that the utilization of 252X required the use of a retread cement on the rubber in order to obtain good adhesion. The particular cement utilized was retread and vulcanizing cement, No. 16–215 manufactured by the Patch Rubber Co. This commercial cement is prepared from a mixture of natural and styrene/butadiene polymers containing tackifiers, carbon black and resins in a toluene/hydrocarbon solvent blend. The results of Examples 2–4 are shown in Table II.

TABLE II

Peel Adhesion Results on Composite (Graphite/PPS) Using Various Conditions and Chemlok 252X

| | Peak (Pli) | Avg. (Pli) | Conditions | Failure |
|---|---|---|---|---|
| Ex. 2 | No Adhesion | | Composite not sandblasted Primer-Chemlok 252 | Interfacial |
| Ex. 3 | 138 | 49.2 | Sandblasted, Primer-Chemlok 252X With Retread Cement on Rubber | To Backing |
| Ex. 4 | 57.2 | 16 | Sandblasted, Primer-Chemlok 252X No Retread Cement on Rubber | To Backing |

In this case it is noted that a retread cement is necessary in order to obtain excellent adhesion with Chemlok 252X primer.

EXAMPLES 5–8

Further examples of the invention include bonding to another composite. The composite was a high modulus, glass filled polyurethane. Four examples were prepared, all sandblasted and bonded to a skimstock rubber in a manner as in examples 1 through 4. Two of the examples used Chemlok 254 primer and two samples used the Chemlok 252X primer. Each primer system also evaluated the effect of using the above mentioned retread cement, that is, with and with out the retread cement on the rubber. The results of examples 5–8 are shown in Table III.

TABLE III

Peel Adhesion Results on a High Modulus, Glass Filled Polyurethane

| | Peak (Pli) | Avg. (Pli) | Conditions | Failure |
|---|---|---|---|---|
| Ex. 5 | 282 | 206 | Sandblasted, primer-Chemlok 254 without retread cement | No failure |
| Ex. 6 | 250 | 143 | Sandblasted, primer-Chemlok 254 with retread cement | No failure |
| Ex. 7 | 247 | 129 | Sandblasted, primer-Chemlok 252X without retread cement | No failure |
| Ex. 8 | 265 | 147 | Sandblasted, primer-Chemlok 252X with retread cement | No failure |

As apparent from Examples 5–8, when a polyurethane glass filled composite was utilized, a retread cement was not necessary.

Figure 1:
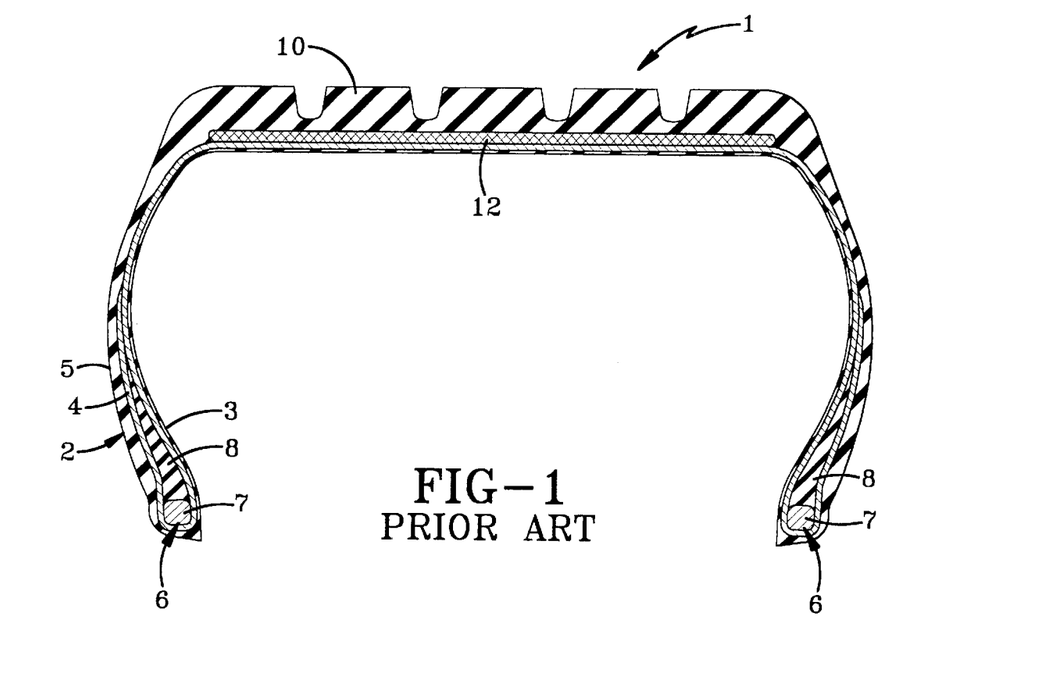
FIG. 1 is a sectional view of a prior art banded pneumatic tire.
Figure 2:
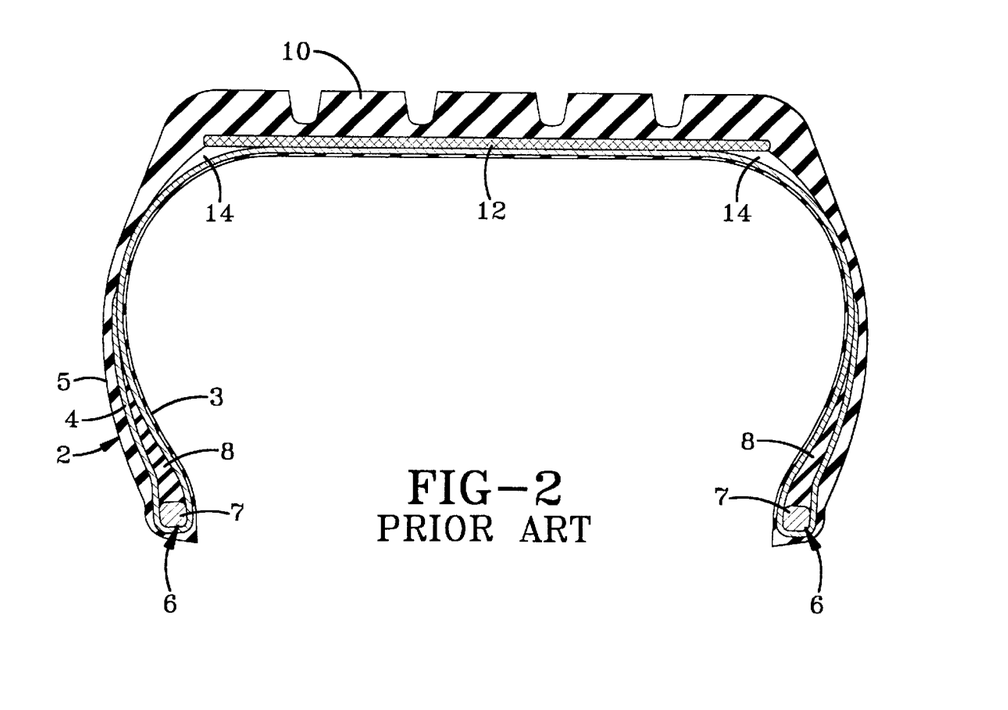
FIG. 2 is a section view similar to FIG. 1 showing the formation of air pockets within a prior art banded tire.

FIG. 1 shows a prior art banded tire indicated generally at 1, which includes a usual body ply carcass indicated generally at 2, which will usually consist of an innerliner 3, a plurality of body plies 4, sidewalls 5 and bead packages 6. Bead packages 6 will typically include a usual bead 7, a bead filler 8 and may have gum abrasive strips and other components therein, all of which are well known in the tire building art. Body ply carcass 2 is assembled and then molded with a typical tread package 10 which will usually contain a tread strip 11 and various reinforcing belts (not shown). A band element 12 is then incorporated between tread package 10 and body ply carcass 2, which is usually accomplished in a second stage tire building machine. FIG. 2 is a sectional view similar to FIG. 1 showing the prior art formation of harmful air pockets 14, wherein air is trapped between the inside diameter of the band, usually adjacent the ends thereof, and the first stage body ply carcass 2. It is this condition discussed above which may produce an unusable tire since curing of a green tire with air trapped within the carcass is unacceptable.

Figure 3:
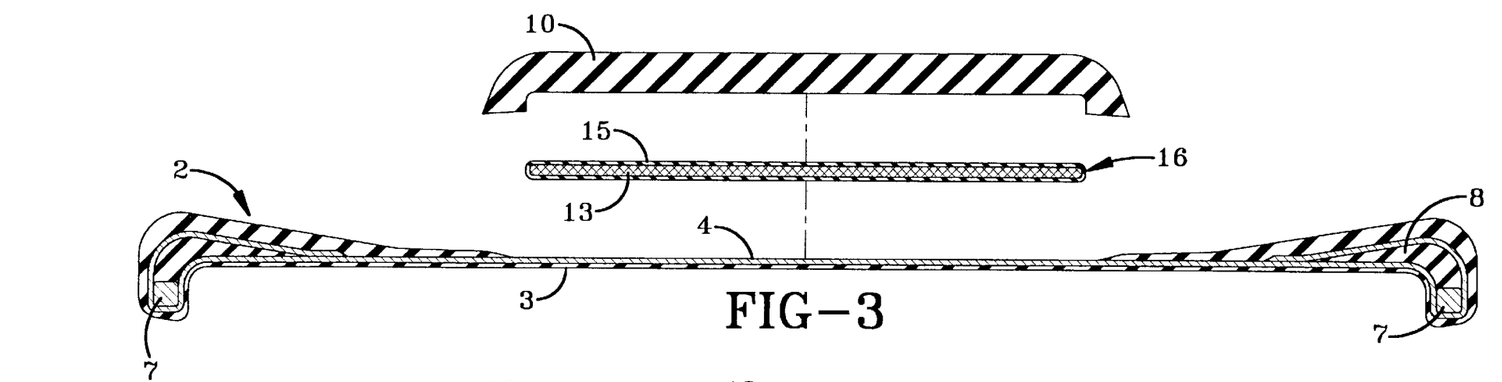
FIG. 3 is an exploded sectional view showing the improved elastomeric encapsulated band and a tire carcass prior to being joined with a tread package.

In accordance with the embodiment of the invention as shown principally in FIG. 3, the problems of the formation of air pockets 14 is substantially eliminated by first coating one or more surfaces of a band element 13 with a layer of uncured rubber 15 to form a rubber/band composite indicated generally at 16. Band 13 is of a usual construction such as shown in the above mentioned U.S. patents and in patent application Ser. No. 08/782,364, filed Jan. 13, 1997, now U.S. Pat. No. 5,879,484, the contents of which are incorporated herein by reference. Preferably band 13 will be formed of steel, aluminum, thermoplastic and thermosetting materials, or a variety of multi-layered composites.

Figure 5:
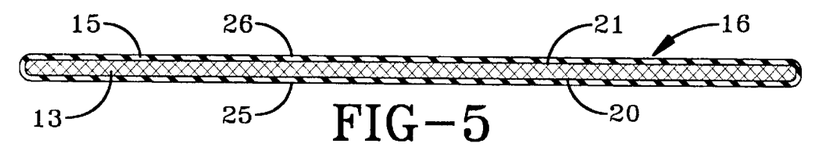
FIGS. 5, 6, 7, 8 and 9 are enlarged sectional views of tire bands with elastomeric coatings on various surfaces thereof for subsequent incorporation with a tire carcass as shown in FIG. 3.
Figure 6:
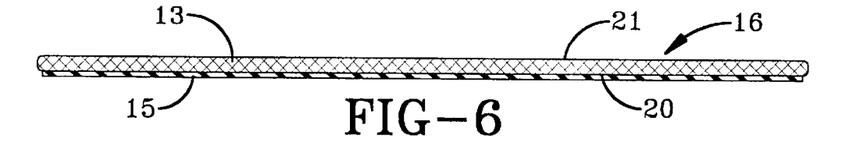
Figure 7:
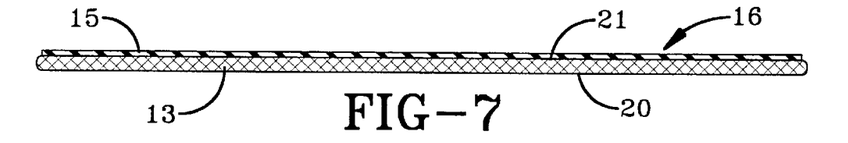
Figure 8:
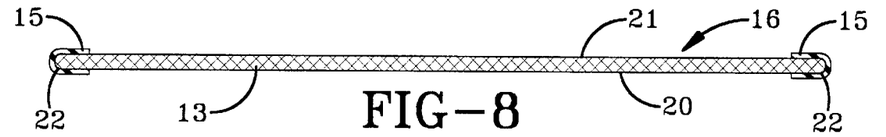

The uncured rubber 15 or elastomeric material is applied to band element 13 by various procedures such as by first applying an adhesive cement 18 (FIG. 10) and then applying rubber 15, such as in strips either to inside surface 20 of band 13 (FIG. 6), outside surface 21 (FIG. 7), or the end edges 22 (FIG. 8). In the preferred embodiment, the entire band 13 is coated as shown in FIG. 5, by spirally winding rubber strips onto the band.

Figure 4:
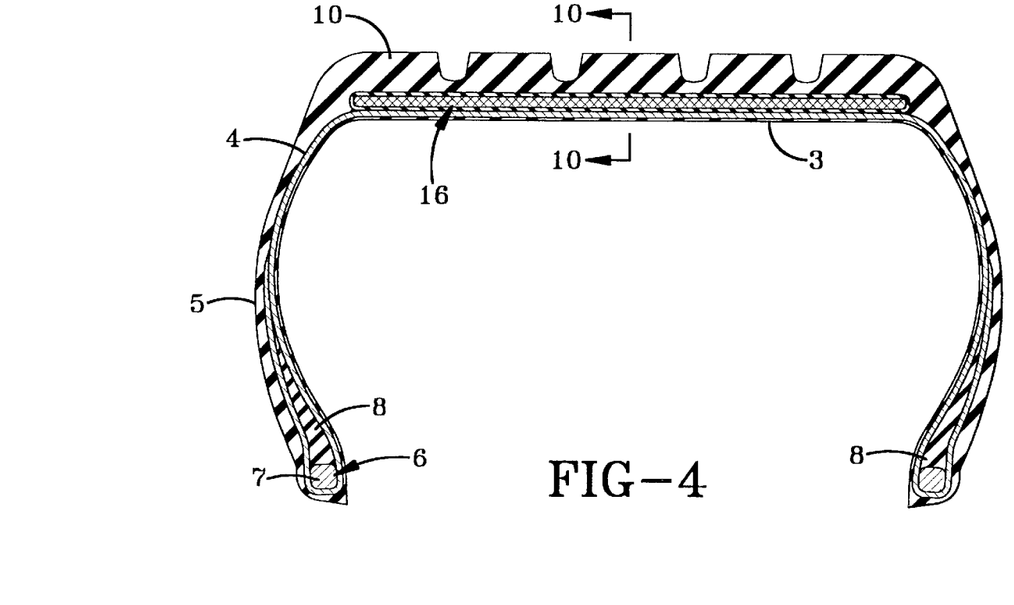
FIG. 4 is a sectional view similar to FIGS. 1 and 2 of the improved banded pneumatic tire produced by the method of the present invention.

After the rubber coating 15 is applied in one or more of the various method steps discussed above and shown in FIGS. 5–10, rubber/band composite 16 is then cured or partially cured to form the desired finalized band. All of the steps for forming composite 16 can be performed at a location remote from that at which the final tire is built for ease of manufacture, after which it is then shipped to a tire assembly location where it is incorporated into a usual tire manufacturing and assembly operation. The subsequent assembly of composite 16 within a tire is accomplished by placing rubber/band composite 16 around body ply carcass 2 in a usual second stage tire building machine and applying an adhesive 24 to inside diameter surface 25 and to outside diameter surface 26, after which the body ply carcass is expanded outwardly to join composite 16 with a usual tread package 10 as shown in FIGS. 3 and 4. The tread package and body ply carcass are then stitched together to form a green tire with rubber/band composite 16 being securely sandwiched therebetween as accomplished in a usual tire building operation.

The assembled green tire then is transported to a usual mold 30 (FIG. 12) where it is cured into a final cured tire after inflation of curing bladder 31. However, due to the formation of rubber/band composite 16, and in particular the curing or partially curing of the rubber coating 15 thereon, in combination with the applied adhesive, provides sufficient strength between the composite 16 and the tread package and/or body ply carcass 2, that upon expansion of curing bladder 31 the cords of the body ply cannot pull rubber away from the band to form air pockets as sometimes developed in prior art banded tires wherein the band was not coated with rubber as in the present invention. This arrangement of first forming composite 16 provides greater strength than that provided heretofore by the natural tackiness of the exposed green rubber in the body ply carcass or in the tread package 10.

In the preferred embodiment, the thickness of rubber coating 15 preferably is within the range of between 0.005 inches to 0.05 inches with the preferred thickness range being 0.01 to 0.04 inches, and with the preferred thickness being 0.02 inches.

Figure 9:
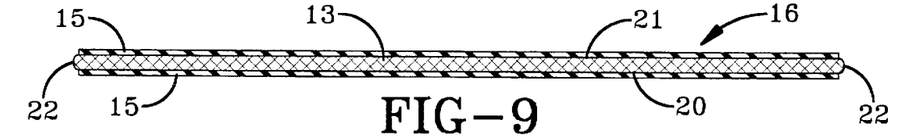
Figure 10:
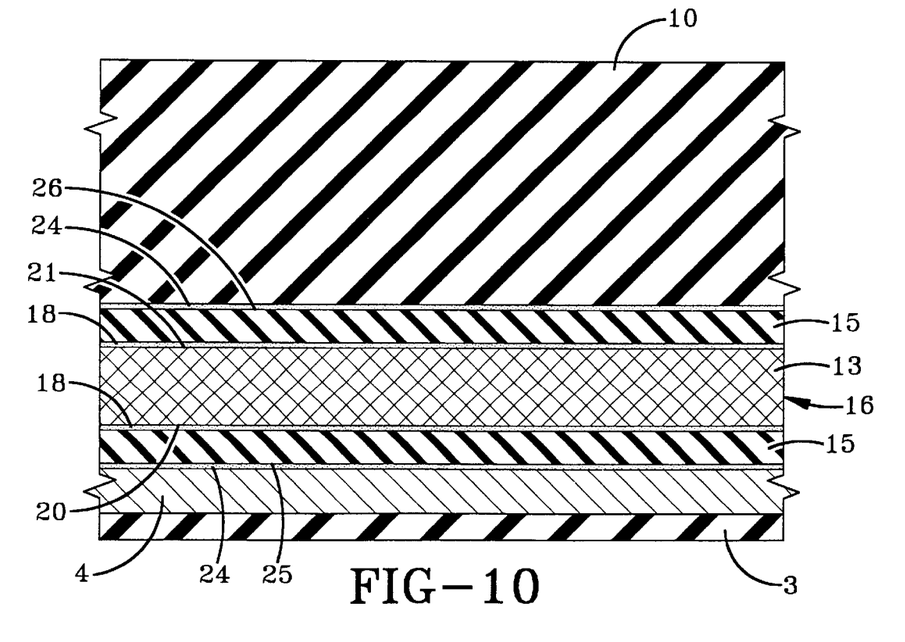
FIG. 10 is a greatly enlarged fragmentary sectional view taken on line 10—10, FIG. 4.
Figure 11:
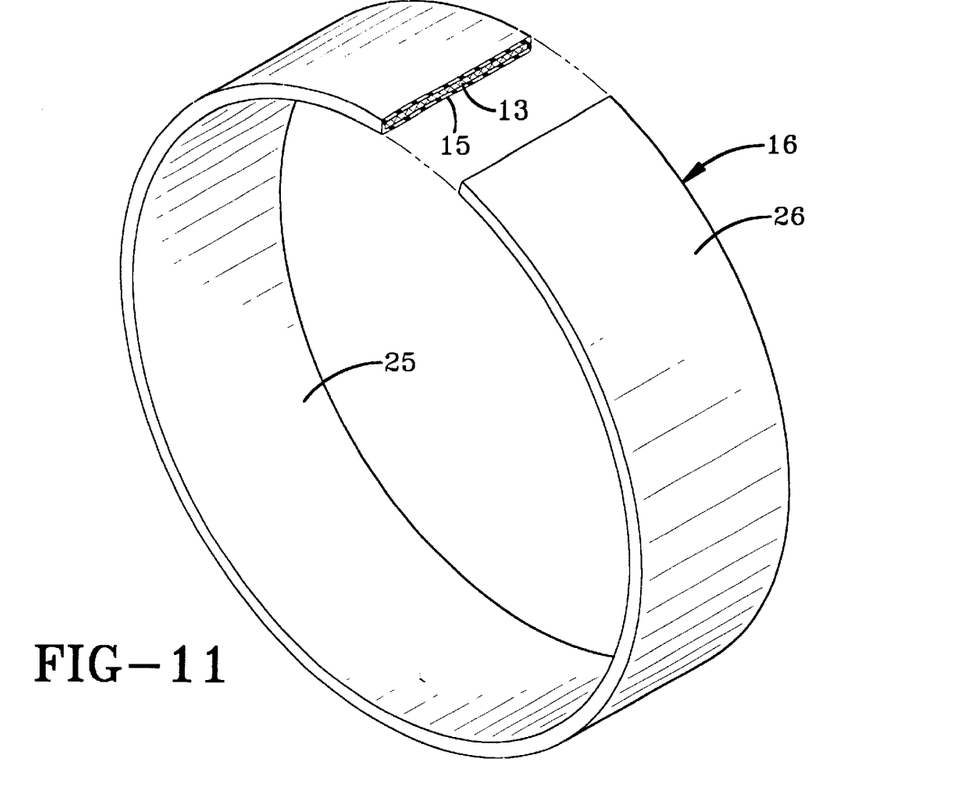
FIG. 11 is a perspective view with portions broken away and in section showing the improved tire band produced by the improved method of the present invention.
Figure 12:
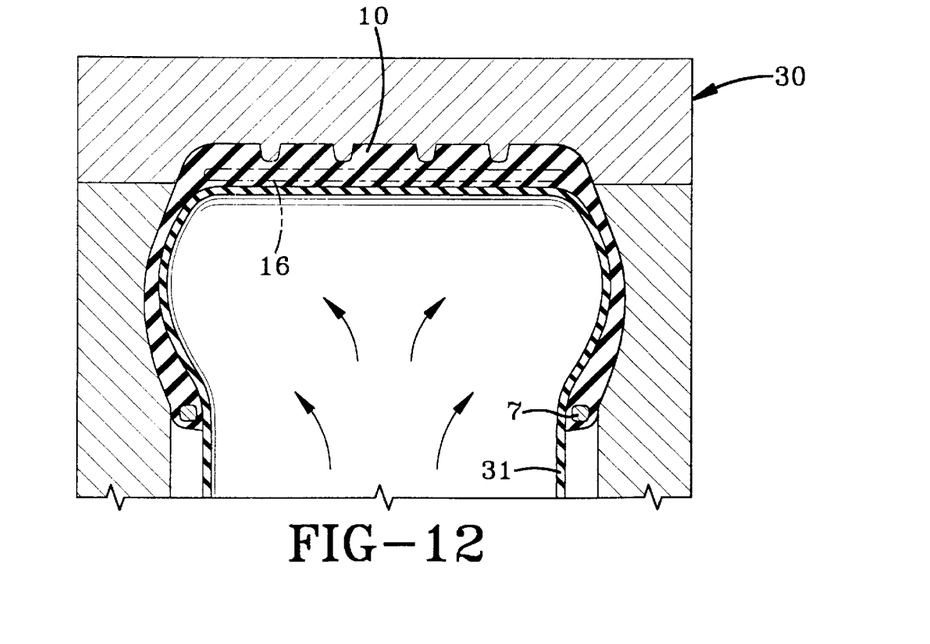
FIG. 12 is a diagrammatic fragmentary sectional view showing the curing of the tire of FIG. 4 within a mold.

Rubber coating 15 is a usual type of gum rubber compatible with the particular rubber used in the formation of the body ply carcass and/or tread package thereby providing a known compatibility between the rubber materials when the green tire is finally cured into a finished tire. As shown particularly in FIGS. 5–9, rubber coating 15 may be applied at various locations on band 13. This will depend primarily upon the particular type of tire in which the rubber/band composite 16 will be incorporated. However, in the preferred embodiment, band element 13 will be coated as shown in FIG. 5, although it could be coated as shown in FIG. 9 with its end edges 22 exposed.

In summary, the improved composite band element of the present invention and method of building the same provides for the subsequent formation of a run flat banded tire which is less susceptible to the formation of possible harmful air pockets and blistering as could occur in prior art banded tires without substantially increasing the cost and manner of production by precoating the band element with one or more layers of rubber which is subsequently cured or partially cured prior to placing the composite rubber/band between the body ply carcass and tread package to provide sufficient adhesion to the adjacent tire components to prevent the cords of the body ply from pulling away from the band, which heretofore formed the undesirable air pockets.

Accordingly, the improved band element and method for building the same for subsequent incorporation into a run flat banded tire is simplified, provides an effective, safe, inexpensive, and efficient method which achieves all the enumerated objectives, provides for eliminating difficulties encountered with prior methods, and solves problems and obtains new results in the art.

In the foregoing description, certain terms have been used for brevity, clearness and understanding; but no unnecessary limitations are to be implied therefrom beyond the requirement of the prior art, because such terms are used for descriptive purpose and are intended to be broadly construed.

Improved embodiments of the present invention are shown in FIGS. 16–19. Laminates 90, 95, 100, and 105 contain various layers to effectively bond composite 110 to one or more rubber substrates. That is, improved adhesion between the composite and a rubber substrate is obtained along with generally the elimination of blistering, air pockets, or entrapment between the composite and the substrate, as well as generally elimination of any separation of the various layers.

Composite 110 can be the same as set forth hereinabove and thus is hereby incorporated by reference. Thus, the composite contains a high melting point thermoplastic polymer binder such as polyphenylene sulfide, polyimide, polyurethane, or polyurea with the melting points of the polymer being at least 225 or 250° C., desirably at least 275° C., and preferably at least 300, 325 and even 350° C.

Alternatively, a thermoset epoxy resin can be utilized as a binder. The epoxy resin or polymer is generally formed by the reaction of bisphenol A and epichlorohydrin. The preparation of epoxy resins is well known to the literature and to the art. Generally, epichlorohydrin is reacted with a variety of hydroxy, carboxy, or amino compounds to form monomers with two or more epoxide groups, and these monomers are then used in the reaction with bisphenol A. Examples of such compounds are the diglycidyl derivative of cyclohexane-1,2-dicarboxylic acid, the triglycidyl derivates of p-aminophenol and cyanuric acid, and the polyglycidyl derivative of phenolic prepolymers. Epoxidized diolefins can also be employed. Various co-reactants can be utilized to cure epoxy resins either through the epoxide or hydroxyl groups. Polyamines such as primary or secondary amines are a common curing agent such as aliphatic amines having a total of from about 2 to about 18 carbon atoms and desirably from about 4 to about 8 carbon atoms. Suitable compounds include diethylene triamine, triethylene tetramine, 4,4'-diaminodiphenylmethane, and polyaminoamides. A combination of diethylene triamine and tetraethylene pentamine is often desired. Aromatic amines can also be utilized such as those having a total of from 6 to 20 carbon atoms such as meta or paraphenylene diamine and the like. Other curing agents including polythiols, dicyandiamide (cyanoguanidine), diisocyanates, and phenolic prepolymers. Curing of epoxy resins can also be achieved by ring opening polymerization of the epoxide groups using either Lewis acids or Lewis bases.

The binders of present invention generally have good solvent resistance and polyphenylene sulfide or epoxy binders are preferred.

As noted above, high modulus fibers are preferred such as graphite or carbon, and to a lesser extent boron fibers, nylon fibers, polyester fibers and glass fibers. The length of the fibers are generally very long such that the fibers are considered to be continuous. The length of the fibers vary over a considerable range such as from about 100 to about 1,000 feet, desirably from about 200 to about 800 feet and preferably from about 300 to about 500 feet. The diameter thereof can vary but typically is approximately 3 to about 10 microns with from about 5 to about 7 microns being desired. However, the diameter of glass fibers is from about 10 to about 70 microns. The fibers in the, composite can either be non-woven or woven. The amount of the fibers is generally from about 40 to about 90 parts by volume, desirably from about 50 to about 85 parts by volume and preferably from about 60 to 70 parts by volume for every 100 parts by weight of the high melting point polymeric binder.

As also noted above, the composite can be of any desirable shape, size or form and is made by melting the binder and adding it to a continuously wound fiber, or by adding and mixing the fibers into a high melting point binder in a molten state, shaping the mixture into its desired form such as sheet and cooling. When an epoxy binder is utilized, the fibers are mixed therein, and the composite is shaped into a desirably end shape in any conventional manner such as by utilizing a mold. The epoxy is then cured or crosslinked. A preferred end use is as a belt in a run flat tire. The modulus of elasticity of the composite, i.e. Young's modulus is generally at least 7.5 or 10 million when graphite or carbon fibers are utilized, desirably from about 10 million to about 20 million, and preferably about from 12 million to about 16 million. The modulus of the composite is slightly lower when the other types of fibers are utilized such as fiberglass such as from about 1 million to about 12 million and preferably from about 2.5 million to about 10 million.

Figure 16:
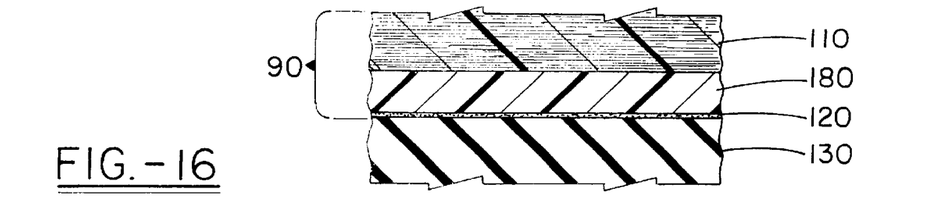
FIG. 16 is a cross sectional view of an article wherein an encapsulated composite is adhered to a primed rubber substrate.
Figure 17:
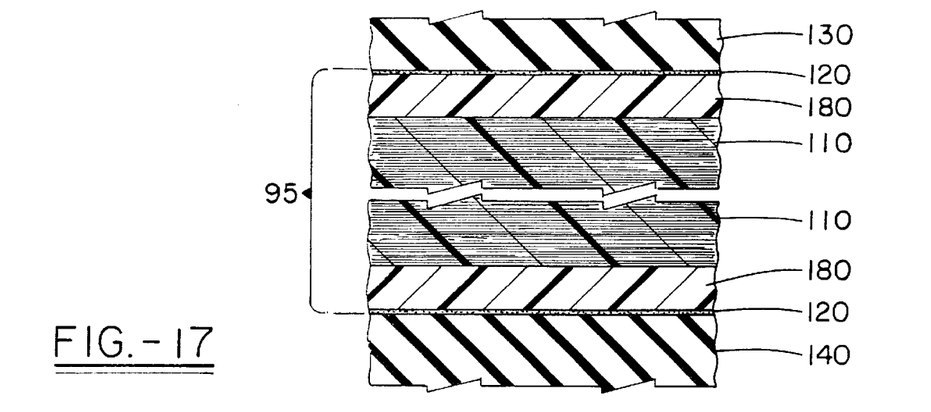
FIG. 17 is a cross sectional view of an article wherein a composite encapsulated is adhered on both sides to a primed rubber substrate.
Figure 18:
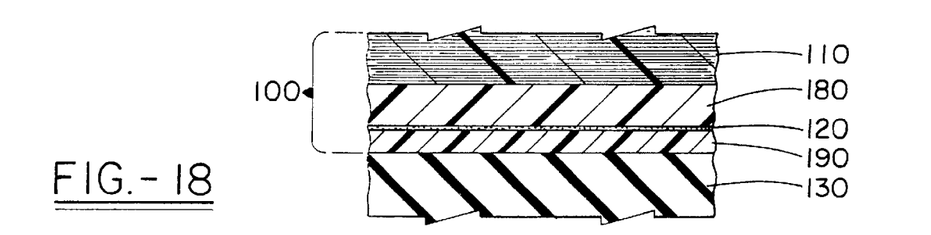
FIG. 18 is a cross sectional view of an article wherein a high modulus composite through a plurality of layers is adhered to a rubber substrate.
Figure 19:
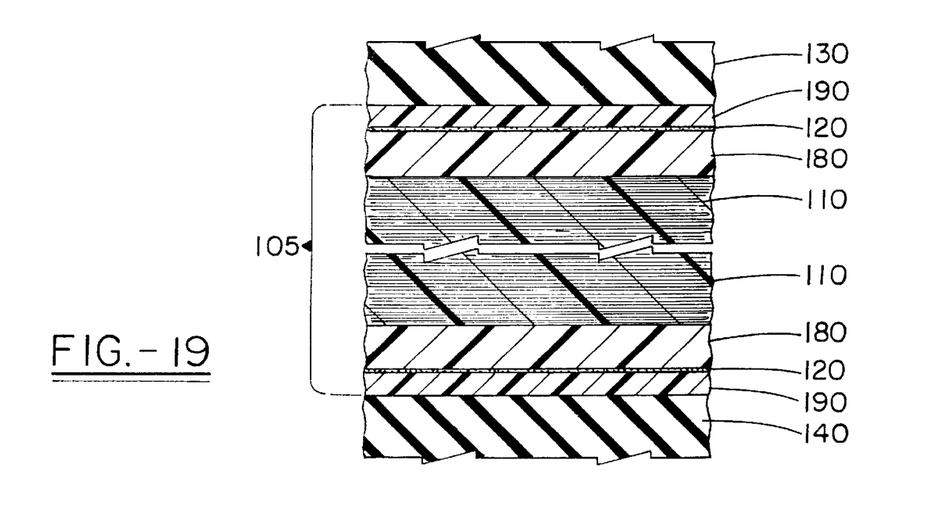
FIG. 19 is a cross section view of an article wherein a high modulus composite is adhered on both sides through a plurality of layers to a rubber substrate.

The composite can be attached to a single rubber substrate as in FIGS. 16 and FIGS. 18 or to a plurality of rubber substrates as in FIGS. 17 and 19. While the present invention can have many different end uses, a preferred embodiment is as a belt in a cured run flat tire. The thickness of the composite can vary depending upon the specific end use and often is from about 30 to about 500 mils, desirably from about 75 to about 200 mils, and preferably from about 100 to about 150 mils.

In order to keep the various fibers fixed or contained within the composite, that is not separated from the composite or pulled out of the composite-belt or band, laminates 90, 95, 100, and 105 contain encapsulating layer 180 thereabout. The encapsulating layer can either be located on one side thereof as in FIGS. 16 and 18, or it can be located on two sides of the composite layer as in FIGS. 17 and 19, or it can be located entirely thereabout as on the top and bottom sides, both ends, as well as the front and rear portions thereof. Encapsulating layer 180 can be any encapsulating compound, sealant, or resin which forms a good bond between composite 110 and primer layer 120 and also results in a tough, durable, high modulus coating. Suitable coating resins include various urethane powder coating resin, various polyimide resins, and the like, with epoxy resins being preferred. The encapsulating layer generally has a thickness from about 10 to about 80 mils and desirably from about 25 to about 35 mils.

The epoxy encapsulating layer can be cured at room temperature for about 8 or 10 to about 24 hours, or can be cured at elevated temperatures such as from about 60° C. to about 120° C., or from about 70° C. to about 90° C. at short periods of time such as about approximately 30 minutes to about 1 or 2 hours. The epoxy layer can be applied in any conventional manner to composite 110 by brushing, spraying, or extruding, and the like.

The epoxy resin which can be utilized as a binder in composite layer 110 as well as encapsulating layer 180 is commercially available as Fusor 310B and Fusor 320 manufactured by Lord Chemical of Erie, Pa., and Master Bond EP3O (A&B) manufactured by Master Bond Inc., Hackensack, N.J.

Unexpectedly, it has been found that the application of encapsulating layer 180 to the composite results in abatement or prevention of the fibers from being separated therefrom. In other words, during use of an article such as a tire, removal, or exposure of the fibers located in the binder is abated or even completely eliminated. Thus, tread-pull peel adhesion is no longer inconsistent such as from about 50 lbs. (separated or exposed fiber) to about 500 lbs., but is dramatically improved to a range of about 300 lbs. to about 650 lbs. and desirably from about 450 lbs. to about 600 lbs.

The encapsulated composite embodiment can be utilized in a tire as shown in FIG. 14. That is, encapsulated composite 110 as shown in FIGS. 17 and 19 can be adhered on one side to a tire carcass and on the other side to a tire tread to produce a run flat tire.

A primer layer 120 exists directly on encapsulated resin layer 180 to provide a good bond to a dissimilar material such as rubber. The rubber can be either a tread rubber or a carcass rubber as shown in the embodiments of FIGS. 16 and 17, or it can be an undertread rubber as shown in the embodiments of FIGS. 18 and 19.

While rubber primers might be utilized, unexpectedly it has been found that a desired class of primers are so called metal primers which result in a good bond of the high modulus composite to the rubber. These primers have been described herein above and the same is fully incorporated by reference. Such primers desirably contain dinitroso compounds or derivatives thereof, as noted above. Generally, such primers can be a mixture of a polymer such as a chlorosulfonated polyethylene, a halogenated paraffin, a curative, and a solvent. Primer 120 can be applied directly to encapsulating layer 180, or directly to undertread layer 190, or both. Such primers are commercially available such as Chemlok 254, or Chemlok 252X, manufactured by Lord Chemical. Another suitable class of primers are those described in U.S. Pat. No. 5,200,455, which is hereby fully incorporated by reference with regards to all aspects thereof.

The thickness of the primer layer is rather thin as generally from about 0.5 to about 4 mils and desirably from about 1 to about 3 mils. The primer layer can be applied in any conventional matter such as brushing, spraying, and the like. The primer layer is generally added only to encapsulating layer 180. Subsequently, either an undertread layer or a rubber substrate layer is applied thereto as discussed more fully herein below.

As noted above, in the embodiments of FIGS. 16 and 17 primer layer 120 adheres the encapsulating layer directly to a rubber layer which can be a rubber tread 130 or a tire carcass 140. In the embodiment of FIGS. 18 and 19, it adheres the encapsulating layer directly to undertread layer 190.

Undertread layer 190 serves to provide a good bond between the composite-encapsulating resin-primer layer, i.e., the composite core, and the one or more rubber substrates. Desirably, as shown in FIG. 18, undertread layer 190 can be located on only one side of the combined layers 110, 180, and 120, i.e. the composite core as, or it can be located on both sides thereof as shown in FIG. 19. Preferably, undertread layer 190 exists on the top, bottom, on both ends, as well as the front and back sides of the composite core. The undertread layer is desirably a rubber such as natural rubber, rubber made from conjugated dienes having from 4 to 10 carbon atoms such butadiene, isoprene, hexadiene, and the like as well as various combinations thereof or blends thereof. Another suitable class of rubbers are those made from conjugated dienes having from 4 to 10 carbon atoms with vinyl substituted aromatic monomers having from 8 to 12 carbon atoms such as styrene, alpha-methyl styrene, and the like with a preferred copolymer being styrene-butadiene rubber. While various synthetic rubbers can be utilized, preferably undertread 190 is made from natural rubber and can contain small amounts of synthetic rubber therein such as polybutadiene, styrene butadiene rubber, or polyisoprene as generally 40 percent or less and preferably 25 percent or less by weight based upon the total of all rubbers in the undertread layer. The thickness of undertread layer 190 is generally from about 5 to about 30 mils, desirably from about 10 to about 20 mils.

Undertread layer 190 can contain various conventional rubber compounding additives and the like such as fillers, for example, carbon black, clay, and talc; stearic acid; zinc oxide; various processing oils such as aliphatic or aromatic; various antioxidants; various antiozonates; various accelerators such as thiazoles, thiurams, sulfenamides, guanidines, thiocarbanates; as well as various vulcanizing compounds such as sulfur; and the like. Desirably, a master batch is first formed and subsequently curing compounds as various accelerators added thereto. The undertread layer is then applied to the previous noted layers, i.e. the composite core. Desirably, the underlayer is uncured and is not cured until the rubber substrate is cured.

One or more rubber substrates as noted hereinabove, are attached directly to the undertread layer. Since a preferred use of laminates 100 and 105 is as a run flat belt in a tire, one rubber substrate can be the tread 130 of a tire with the other substrate being the tire carcass 140.

Various rubber substrates such as 130 and 140 are generally made out of rubber compounds, fillers, additives, etc. as noted hereinabove and thus are fully incorporated by reference. Due to the exceedingly high modulus of laminates 90, 95, 100, and 105 as well as the high modulus of composite 110 per se, a very effective run flat tire is produced. That is, the composite layer generally cannot be penetrated by sharp articles such as pieces of metal, screws, nails, glass, and the like. Yet the band is elastic enough to partially deflect as when a specific portion of the tire engages a rough surface.

Laminates 90, 95, 100 and 105 of the present invention can also be utilized wherever an exceedingly high modulus laminate is desired as in motor mounts, bridge dampers, and the like. The advantages of such a laminate is that good adhesion is obtained to a rubber substrate with substantially reduced or no blistering, air pockets, or separation of various layers.

The invention will be better understood by reference to the following examples, which serve to illustrate, but not limit, the present invention. Examples 9 and 10 through the tread pull data relate to an embodiment as set forth in FIGS. 16 and 17 wherein primer layer 120 adheres rubber layer 130 directly to encapsulating layer 180.

EXAMPLE 9

A section of the polyphenylene sulfide/graphite composite material was sandblasted and then degreased with acetone on Rymplecloth (American Fibers Corp.). The sample was allowed to dry thoroughly. Fursor 310B/320 was mixed thoroughly (12.5 gm Fusor 320 and 5 gm Fusor 310B) and then dissolved in a minimum amount of acetone (ca. 15 ml). This epoxy encapsulating solution was painted onto the polyphenylene sulfide/graphite surface, allowing each coat to dry before the next coat was applied. Several coats were so applied to seal the fibers. After the last coat was added and allowed to dry, the sample was cured in an oven at 80° C. for 1 hr. The sample was allowed to cool to room temperature and one coat of Chemlok 254 primer was painted on top of the Fusor 310B/320 surface. It was allowed to dry and then baked in an oven for 1 hr. at 80° C. A peel adhesion pad was built by placing a piece (6"×6"×0.04") of untreated underlayer rubber (J2917) on top of the primed surface (a spacer made out of Mylar was used in order to retain an area for pulling the sample). On top of this material was placed a reinforcing ply (6"×6"×0.050"). The entire sample was taped together with masking tape. It was cured in a steam bomb for 20 minutes at (160° C., 75 psi). The tape was removed and a one-inch strip cut from the sample. A peel adhesion test was run (Standard ASTM test—our number 79, 2"/minute). The result obtained was 108.6 lbs/in average with a peak adhesion of 127.5 lbs./in. The failure was cohesive but mainly in the rubber layer (weakest phase).

EXAMPLE 10

The same procedure of Example 9 was used to evaluate another epoxy, Masterbond, EP30HT (part A) and EP30HT (part B), an amine-cured epoxy. The epoxy was mixed 4 gm. Part A to 1 part (gm) part B. The mixture was once again dissolved in acetone (Batch used was 12 gm part A to 3 gm part B in 15 ml acetone). This system was coated in the same manner as in Example 9. The epoxy was cured 1 hr. at 80° C. Chemlok 254 was coated onto the surface and cured 1 hr. at 80° C. The peel adhesion pad was built and cured the same as part-1 in Example 9.

The peel adhesion results were similar to that obtained in Example 9.

| Peak Adhesion (lbs./in.) | Average adhesion (lbs./in.) |
|---|---|
| 123.7 | 100.2 |

The failure once again was cohesive and mainly in the rubber layer.

Preparation of Tires Using an Adhesive Interlayer for Preparing the PPS/Graphite Bands Full circle bands prepared from the Polyphenylene Sulfide/Graphite composite were prepared by sandblasting, degreasing with acetone on Rymplecloth and allowing the band to dry thoroughly. A solution of the Fusor 320/310B was prepared by the following formulation:

| 1. Fusor 320 | 80 gms. |
|---|---|
| 2. Fusor 310B | 32 gms. |
| 3. Acetone | 56 gms. |
| TOTAL | 168 gms. |

The ingredients were mixed thoroughly to a smooth consistency. The mixture was painted onto the band surface (both sides) with one or two coats of material. The epoxy encapsulant was allowed to dry and cure overnight at room temperature (16–24 hrs). The following day the band was post-cured 30 minutes at 80° C. The band was allowed to cool to room temperature (23° C.) and then coated (both sides) with one coat of Chemlok 254. The primer was allowed to dry at room temperature and then heated to insure that the primer was thoroughly dry (no solvent). The treated band was then stored in a plastic bag until used.

The tire was built by conventional means utilizing an undertread layer wherein the above laminate was used to replace the steel belt package. The tire was cured by means of conventional tire press at normal times and temperatures. A number of tires were built by this procedure. In some instances the tire was tested for adhesion. This procedure consisted of slicing the tread down to the PPS/G band and performing a tread pull. The following data were obtained:

| TREAD PULL DATA | |
|---|---|
| Tread No. | Peel Results (Lbs.) |
| Non Epoxy Treated Bands | |
| A | 500 |
| B | 50 |
| C | 400 |
| D | 300 |
| E | 300 |
| F | 50 |
| Average | 267 |
| Epoxy Treated Bands | |
| G | 600 |
| H | 425 |
| I | 450 |
| J | 300 |
| K | 600 |
| L | 600 |
| M | 525 |
| N | 540 |
| Average | 505 |

As can been seen from the tread pull results, the epoxy coated PPS/G band gave more consistent and high peel values as compared to the non-epoxy treated bands. In the non-epoxy treated bands, poor peel results were obtained such as in Tread B and F due to pockets of air and the like since the composite was not encapsulated. Moreover, even with the higher peel results such as in Examples A, C, D and E the overall average (375 pounds) is much lower than that obtained with the epoxy encapsulated composites or bands.

While in accordance with the Patent Statutes, the best mode and preferred embodiment have been set forth, the scope of the invention is not limited thereto, but rather by the scope of the attached claims.

What is claimed is:

1. A cured tire having a reinforcing layer comprising a laminate;
    wherein said laminate comprises an encapsulated high modulus composite;
    wherein said high modulus composite comprises a binder, a high modulus fiber, and a metal primer;
    wherein said binder is a thermoplastic binder having a melting point of at least 225° C., or a thermoset binder;
    and wherein said primer adheres to at least one side of said encapsulated composite.

2. A cured tire according to claim 1;
    wherein said thermoplastic binder is a thermoplastic polyphenylene sulfide, or a cured epoxy, or combinations thereof;
    wherein said high modulus fibers comprise graphite, carbon, or glass, or combinations thereof;
    and wherein said high modulus fiber has a modulus of elasticity from about 5 million to about 20 million;
    wherein said high modulus composite has a modulus of elasticity of at least 750,000 psi;
    wherein said composite is encapsulated on at least both sides;
    and wherein said encapsulating compound is a urethane resin, a polyimide resin, a cured epoxy resin, or combinations thereof.

3. A cured pneumatic run flat tire comprising:
   a carcass, sidewalls, tire beads, a tire tread, and at least one laminate located beneath said tread, said laminate including a high modulus composite belt comprising:
      a thermoplastic or thermoset binder, wherein, when said binder is selected from a thermoplastic binder, said thermoplastic binder has a melting point of at least 225° C., and
      a reinforcing fiber selected from graphite, carbon, boron, nylon, polyester, glass, and combinations thereof, said reinforcing fiber being present in an amount from about 40 to about 90 parts by volume for every 100 parts by volume of said thermoplastic or thermoset binder, wherein said high modulus composite belt has a modulus of elasticity of at least 750,000 psi;
   a resin encapsulating said high modulus composite belt, said resin selected from urethane resin, polyimide resin, cured epoxy resin, and combinations thereof; and
   a metal primer on said resin.

4. A cured pneumatic run flat tire according to claim 3, wherein said thermoplastic or thermoset binder is selected from thermoplastic polyurethane, polyurea, polyphenylene sulfide, polyimide, cured epoxy, and combinations thereof.

5. A cured pneumatic run flat tire according to claim 4, wherein said modulus of elasticity of said high modulus composite belt is from about 1 million to about 20 million psi.

6. A cured pneumatic run flat tire according to claim 4, wherein said high modulus composite belt has a modulus of elasticity of at least 5 million psi, and wherein the melting point of said thermoplastic binder is at least 250° C.

7. A cured pneumatic run flat tire according to claim 3, wherein said thermoplastic or thermoset binder is selected from polyphenylene sulfide, epoxy, and combinations thereof, wherein said reinforcing fiber is selected from carbon, graphite, glass, and combinations thereof, wherein the amount of said reinforcing fiber is from about 50 parts to about 85 parts by volume, wherein said resin is an epoxy resin and encapsulates said high modulus composite belt on at least two sides thereof.

8. A cured pneumatic tire according to claim 7, wherein said melting point of said thermoplastic binder is at least 275° C.

9. A cured pneumatic run flat tire according to claim 8, wherein said reinforcing fiber is graphite, and said high modulus composite belt has a modulus of elasticity of from about 12 million to about 16 million psi.

10. A cured pneumatic run flat tire according to claim 3, further comprising:
   an undertread layer operatively attached to said resin by said metal primer.

11. A cured pneumatic run flat tire according to claim 10, wherein said undertread layer is a rubber layer, and the modulus of elasticity of said high modulus composite belt is at least 10 million.

12. A cured pneumatic run flat tire according to claim 11, wherein said fiber is selected from graphite, carbon, and combinations thereof, wherein said resin is epoxy resin, wherein said thermoplastic or thermoset binder is selected from polyphenylene sulfide and epoxy, and wherein said undertread layer comprises natural rubber.

13. A cured pneumatic run flat tire according to claim 12, wherein said high modulus composite belt has a modulus of elasticity of at least 12 million psi, and wherein said thermoplastic binder has a melting point of at least 300° C.

14. A method for building a run flat tire comprising the steps of:
   forming a body ply carcass;
   forming a tire tread;
   providing an encapsulated annular high modulus composite comprising a thermoplastic or thermoset binder and a reinforcing fiber;
   assembling said encapsulated composite between said body ply carcass and tire tread;
   adhering said encapsulated composite to said body ply carcass and said tire tread with a metal primer;
   molding said body ply carcass, said encapsulated composite, and said tire tread into a cured tire.

15. A method according to claim 14, wherein said high modulus composite has a modulus of elasticity of at least 750,000 psi, and the amount of said fiber being from about 40 to about 90 parts by volume for every 100 parts by volume of said binder.

16. A method according to claim 15, wherein said binder is a polyurethane, a polyurea, a polyimide, or a polyphenylene sulfide, or combinations thereof, or cured epoxy, and wherein said fiber is a boron fiber, a nylon fiber, a polyester fiber, a glass fiber, a carbon fiber, or a graphite fiber, or combinations thereof.

17. A method according to claim 16, wherein said high modulus composite has a modulus of elasticity of at least 10 million psi, wherein said fiber is said graphite, or said carbon, or combinations thereof, wherein said encapsulating resin is said epoxy resin, and wherein said high modulus composite binder is said polyphenylene sulfide, or said epoxy.

18. A method according to claim 15, including an undertread layer located about said metal primer, said undertread layer adhering said encapsulated composite and said metal primer to said body ply carcass and to said tire tread.

* * * * *